United States Patent
Takayanagi et al.

(10) Patent No.: US 7,837,256 B2
(45) Date of Patent: Nov. 23, 2010

(54) FRONT BODY STRUCTURE FOR VEHICLE

(75) Inventors: Taku Takayanagi, Wako (JP); Hiroyuki Yamashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 12/186,868

(22) Filed: Aug. 6, 2008

(65) Prior Publication Data
US 2009/0039680 A1    Feb. 12, 2009

(30) Foreign Application Priority Data
Aug. 7, 2007    (JP)    ............................. 2007-205557

(51) Int. Cl.
*B60K 8/00*    (2006.01)

(52) U.S. Cl. ............................. 296/203.02; 296/203.01; 180/89.1

(58) Field of Classification Search ............ 296/187.01, 296/187.03, 187.09, 193.01, 193.09, 193.11, 296/193.1, 203.01, 203.02; 180/89.1
See application file for complete search history.

(56) References Cited

U.S. PATENT DOCUMENTS

| | | | | |
|---|---|---|---|---|
| 818,797 | A | * | 4/1906 | Stawartz ..................... 293/43 |
| 4,428,599 | A | * | 1/1984 | Jahnle ......................... 280/784 |
| 4,782,909 | A | * | 11/1988 | Kolodka ..................... 180/271 |
| 6,447,049 | B1 | | 9/2002 | Tohda et al. |
| 6,705,667 | B1 | * | 3/2004 | Bartesch et al. ........ 296/187.01 |
| 6,905,138 | B2 | * | 6/2005 | Borroni-Bird et al. ....... 280/783 |
| 6,938,948 | B1 | * | 9/2005 | Cornell et al. ......... 296/187.09 |
| 6,981,736 | B2 | * | 1/2006 | Morsch et al. ......... 296/193.07 |

FOREIGN PATENT DOCUMENTS

JP    2001-138963    5/2001

* cited by examiner

*Primary Examiner*—Patricia L Engle
*Assistant Examiner*—SunSurraye Westbrook
(74) *Attorney, Agent, or Firm*—Rankin, Hill & Clark LLP

(57) ABSTRACT

A front body structure for a vehicle including a substantially rectangular grid portion composed of a bulkhead upper center frame, front parts of a pair of upper members and a frame suspended between the pair of upper members and extending substantially parallel to the bulkhead center frame, where an opening of the grid portion is covered by a panel member formed of a rigid member such as Carbon Fiber Reinforced Plastics.

8 Claims, 4 Drawing Sheets

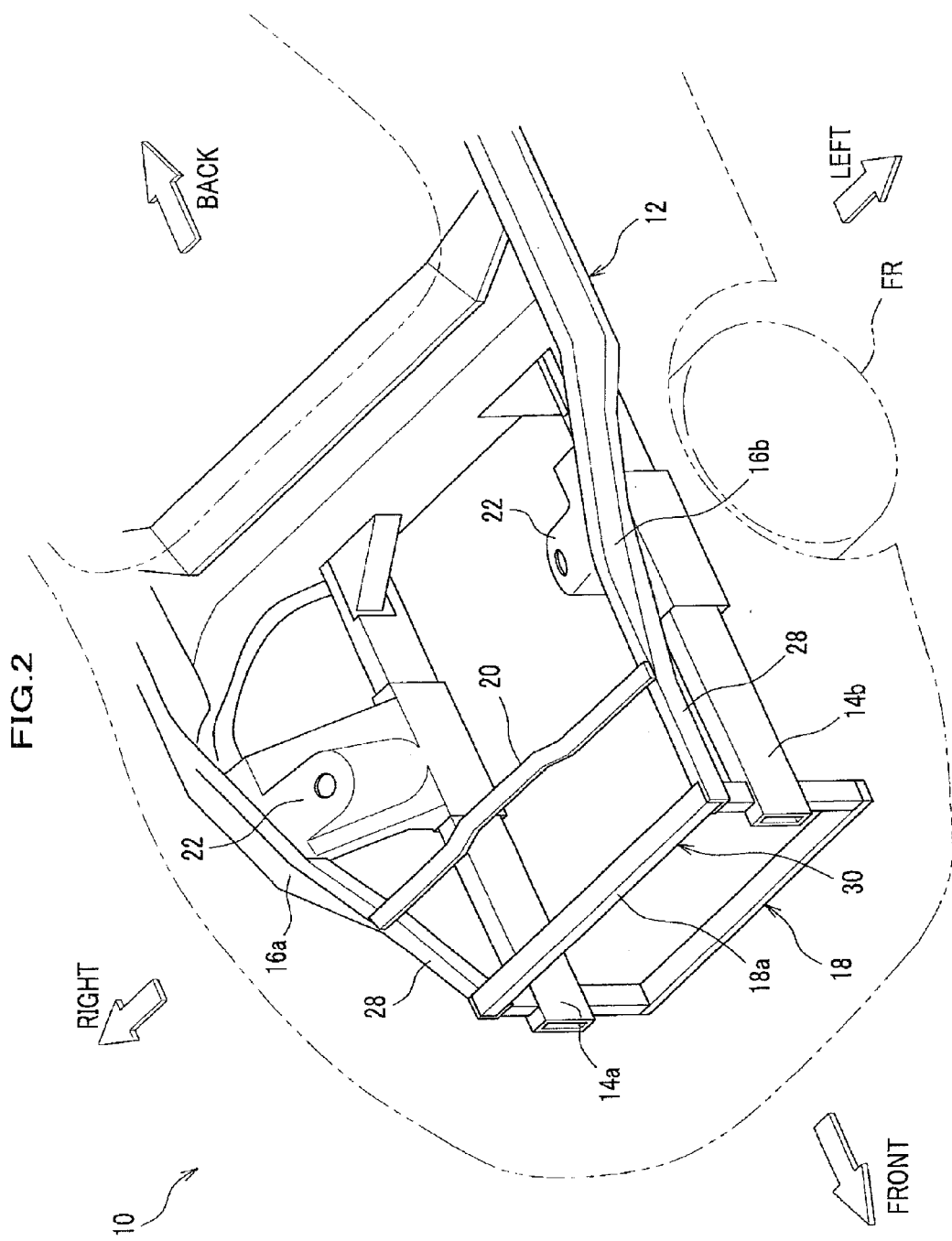

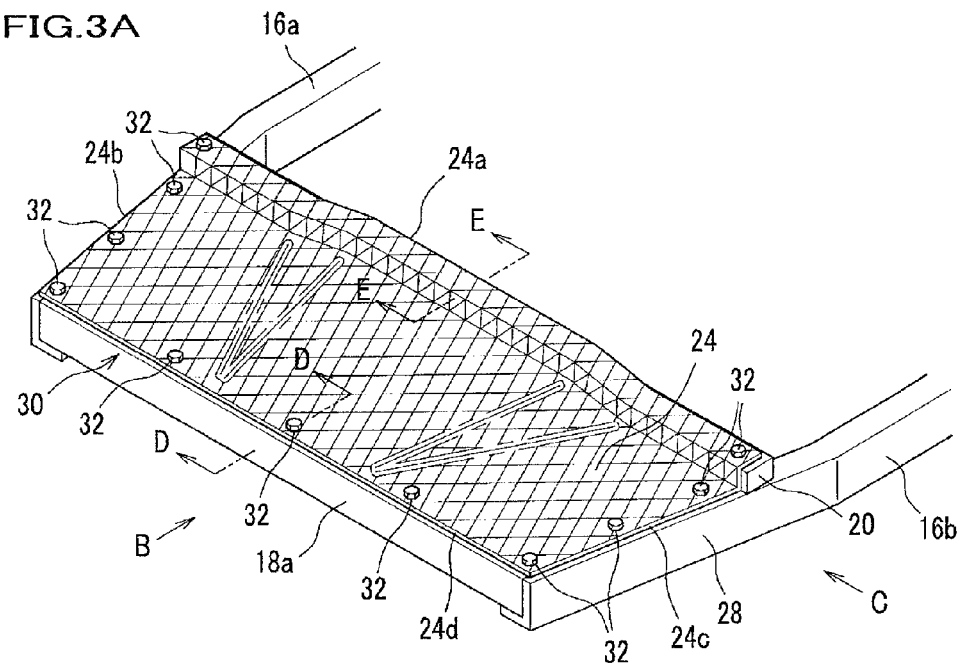
FIG.3A
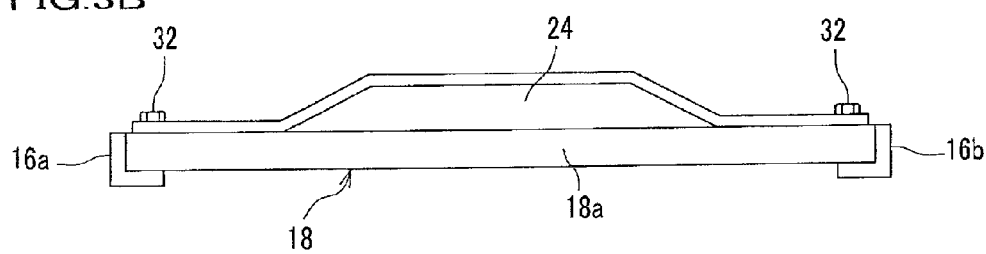
FIG.3B
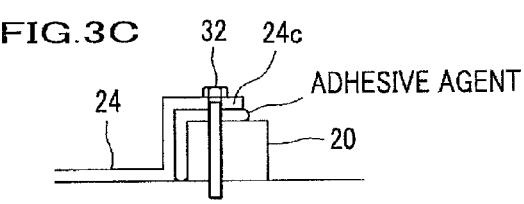
FIG.3C
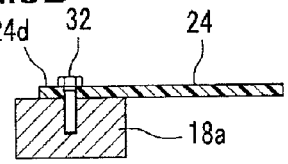
FIG.3D
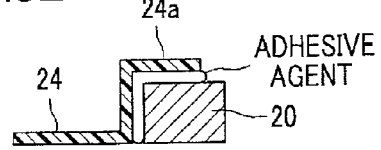
FIG.3E

FRONT BODY STRUCTURE FOR VEHICLE

CROSS REFERENCE TO RELATED APPLICATIONS

This application claims the foreign priority benefit under 35 U.S.C. §119 of Japanese Patent Application No. 2007-205557 filed on Aug. 7, 2007, the disclosure of which is incorporated herein by reference.

BACKGROUND OF THE INVENTION

1. Field of the Invention

The present invention relates to a front body structure for a vehicle such as an automobile.

2. Description of the Prior Art

Japanese Unexamined Patent Application No. 2001-138963 (paragraphs [0004], [0030] and FIG. 2) discloses a pedestrian protective front body for a vehicle including a front spoiler separately disposed from the front end of the nose of the vehicle body, extending in the traverse direction of the vehicle body and buffering an impact greater than a predetermined energy by deforming its shape, thereby to provide improved pedestrian protective performance.

More specifically, the pedestrian protective front body disclosed in Japanese Unexamined Patent Application No. 2001-138963 is configured in such a manner that a stiffener composed of a core beam member extending in the traverse direction of the vehicle body and having a weak point at the center of the stiffener is disposed in the spoiler, and the stiffener is suspended between front side frames via supporting members. With this configuration, the shape of the weak part of the stiffener is allowed to be changed to buffer an impact, which provides improved pedestrian protection performance.

However, the technique disclosed in Japanese Unexamined Patent Application No. 2001-138963 incurs a risk that the stiffener suspended between the front side frames is bent due to a lateral impact applied to the front side frames which rotatably support front wheels when a running vehicle, for example, turns along a curve.

In order to prevent the stiffener from being bent, the stiffener may be formed thick by making the outer diameter of the stiffener greater to improve its stiffness, but this causes another problem that the weight of a vehicle increases as the stiffness is improved. This further causes yet another problem that the equivalent inertia weight of a vehicle also increases as the weight of the front body of the vehicle is increased, resulting in instability of the vehicle. The Japanese Industrial Standards specifies that the equivalent inertia weight of a vehicle is weight of 1.08 times of the vehicle weight including the engine.

SUMMARY OF THE INVENTION

The present invention is made in view of the above problems, and an object thereof is to provide a front body structure for a vehicle which enables to improve the rigidity of the front body of the vehicle with little vehicle weight increase and to efficiently improve the rigidity of the front body of the vehicle in view of vehicle weight.

A first aspect of the present invention provides a front body structure for a vehicle including a pair of upper members extending in a longitudinal direction of a vehicle body, supporting a pair of front wheel dampers and disposed on opposite sides of the vehicle body, a bulkhead upper center frame connected to front ends of the pair of upper members, and a frame disposed rearward of the bulkhead upper center frame in parallel to the bulkhead upper center frame and suspended between the pair of upper members. The front body structure further including a rectangular grid portion formed by the frame, the pair of upper members and the bulkhead center frame, and a panel member covering an opening of the grid portion.

In the aforementioned front body structure, the panel member is preferably formed of fiber reinforced composite material made of at least one of Carbon Fiber Reinforced Plastics, Glass Fiber Reinforced Plastics and poly-paraphenylene terephthalamide Fiber Reinforced Plastics, and an extending direction of continuous fibers of the fiber reinforced composite material crosses the longitudinal direction of the vehicle body.

In the aforementioned front body structure, the frame, at a center part thereof, is bent upward in a convex shape in a front view, and the panel member is formed such that a shape of the panel member is convex along the center part of the frame and is gradually flattened toward the bulk head upper center frame.

In the aforementioned front body structure, the panel member is fixed to an upper surface of the frame and a side surface of the frame which is opposed to the bulk head upper center frame with an adhesive agent.

Other features and advantages of the present invention will become more apparent from the following detailed descriptions of the invention when taken in conjunction with the accompanying drawings.

BRIEF DESCRIPTION OF THE DRAWINGS

FIG. 2 is a perspective view showing a part of the body of the vehicle shown in FIG. 1 from which a panel member is removed.

FIG. 3A is an enlarged perspective view showing the panel member which is fixed to a grid portion.

FIG. 3B is a front view showing the panel member seen in the direction indicated by an arrow B in FIG. 3A.

FIG. 3C is a side view showing the panel member seen in the direction indicated by an arrow C in FIG. 3A.

FIG. 3D is a cross-sectional view along D-D line in FIG. 3A.

FIG. 3E is a cross-sectional view along E-E line in FIG. 3A.

DETAILED DESCRIPTION OF THE INVENTION

Figure 1:
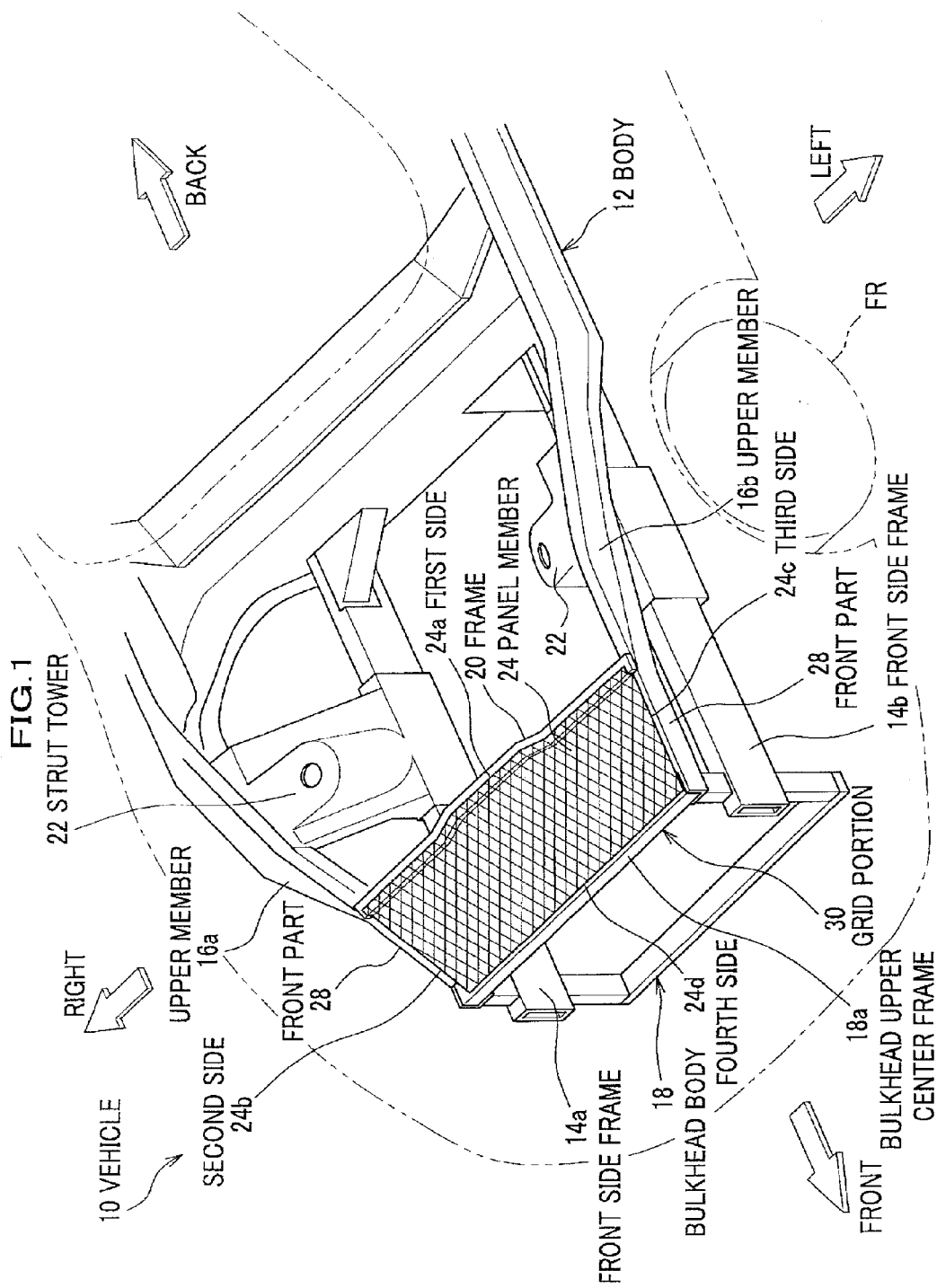
FIG. 1 is a perspective view showing a part of a body of a vehicle employing a front body structure for a vehicle according to an embodiment of the present invention.

Embodiment of the present invention is described in detail below with reference to the accompanying drawings. FIG. 1 is a perspective view showing a part of a vehicle body employing a front body structure for a vehicle according to the embodiment of the present invention. FIG. 2 is a perspective view showing a part of the vehicle body shown in FIG. 1 from which a panel member is removed.

As shown in FIGS. 1 and 2, a front part of a body (vehicle body) 12 of a vehicle 10, such as an automobile, includes a pair of front side frames 14a and 14b extending along the longitudinal direction of the body 12 and disposed on the right side and left side of the vehicle body, respectively, and a pair of upper members 16a and 16b disposed above the pair of front side frames 14a and 14b with a predetermined distance therefrom and extending along the longitudinal direction of the body 12.

The front part of the body 12 also includes a bulkhead body 18 which is a substantially-rectangular-shaped frame body composed of a plurality of members and is connected to front ends of the pair of front side frames 14a and 14b, and a frame 20 that is disposed rearward of a bulkhead center frame 18a constituting the bulkhead body 18 and is suspended between the pair of upper members 16a and 16b in the traverse direction. A bend portion which is bent upward a little in substantially convex shape is formed at substantially center of the frame 20 in consideration of the layout of components (not shown) disposed in an engine room.

Strut towers 22 that support struts (not shown) are provided at the vicinity of the center of each upper members 16a and 16b, and the lower ends of the strut towers 22 are respectively connected to the pair of front side frames 14a and 14b. Each strut (not shown) carries, for example, a coil spring that absorbs an impact and a shock absorber that damps the up-down movement of the coil spring and is constituted as a front wheel damper.

Connected to the lower end of the strut (not shown) is an under-spring member (not shown) such as a front wheel including a tire. As shown in FIG. 2, the front end portions of the upper members 16a and 16b are respectively connected to the opposite ends of the bulkhead upper center frame 18a.

Disposed at the front part of the body 12 is a panel member 24 composed of a rigid member made of fiber reinforced composite materials such as Carbon Fiber Reinforced Plastics (CFRP), Glass Fiber Reinforced Plastics (GFRP) and poly-paraphenylene terephthalamide (KEVLAR) Fiber Reinforced Plastics (KFRP), or materials such as aluminum (including aluminum alloy) and steel.

To be more specific, a substantially rectangular grid portion 30 is formed by the following four members: the bulkhead upper center frame 18a which is the upper horizontal member of the bulkhead body 18; two front parts 28 of the pair of upper members 16a and 16b disposed substantially parallel to each other; and the frame 20 suspended between the pair of upper members 16a and 16b and extending substantially parallel to the bulkhead upper center frame 18a. The opening of the grid portion 30 is covered by the panel member 24 which is formed rectangular in shape in plain view to meet the shape of the grid portion 30. The part of the panel member 24 which is to be fixed to the bend portion of the frame 20 is disposed along the bend portion of the frame 20, and thus the part of the panel member is formed in substantially the same shape as the convex shape of the bend portion. The convex shape of the panel member 24 is gradually flattened toward the bulkhead upper center frame 18a as shown in FIG. 3A.

The panel member 24 is fixed to the grid portion 30 with fastening members such as bolts 32 and adhesive agents (see FIG. 3A). To be more specific, a first side 24a extending in the lateral direction of the panel member 24 is adhered to the upper surface of the frame 20 and the side surface of the frame 20 which is opposed to the bulkhead upper center frame 18a with an adhesive agent as shown in FIG. 3E. A second side 24b and a third side 24c extending in the front-back direction of the panel member 24 are respectively fixed to the front parts 28 of the upper members 16a and 16b with the bolts 32, as shown in FIG. 3C. The bolts 32 also come through the frame 20 to fasten the frame 20 to each upper member 16b (and 16a). A forth side 24d extending in the lateral direction of the panel member 24 is fixed to the bulkhead upper center frame 18a of the bulkhead body 18 with the bolts 32 as shown in FIG. 3D.

It is to be noted that methods for fixing the panel member 24 to the grid portion 30 are not limited to the method using the adhesive agents and the bolts 32, and may include other methods using welding or sealing members (not shown), etc.

The body 12 of the vehicle 10 which employs the front body structure for a vehicle according to the embodiment is basically configured as described above. Effects of the front body structure are described below.

When the vehicle 10 turns along a curve, a lateral impact is applied to the front side frames 14a and 14b including struts (not shown) which rotatably support front wheels, and the lateral impact is further applied to the frame 20 suspended between the pair of upper members 16a and 16b.

In the embodiment, because the grid portion 30 including the frame 20 is covered by the flat panel member 24 which pulls the frame 20 toward the bulkhead upper center frame 18a of the bulkhead body 18 and/or the front parts 28 of the pair of upper members 16a, 16b, the rigidity of the frame 20 is increased, whereby the frame 20 can be preferably prevented from being deformed.

In other words, when an external impact is applied to the frame 20 which constitutes a part of the grid portion 30, the external impact is absorbed or distributed by the panel member 24 composed of a flat rigid member, preventing the frame 20 from being deformed.

It is more preferable to form the panel member 24 with Carbon Fiber Reinforced Plastics or Glass Fiber Reinforced Plastics made of fiber fabrics woven with filamentous fibers where the extending direction of the filamentous fibers crosses the longitudinal direction of the vehicle body as shown in FIG. 1 and FIG. 3.

Even if the bend portion is formed in the frame 20 in consideration of the layout of components (not shown) disposed in an engine room, when an external force is applied to the frame 20 to deform the frame 20 upward, the filamentous fibers which cross the longitudinal direction of the vehicle body pull the frame 20 toward the bulkhead upper center frame 18a, whereby the frame 20 disposed rearward of the bulkhead upper center frame 18a can be preferably prevented from being deformed.

Furthermore, even if the bend portion is formed in the frame 20 in consideration of the layout of components (not shown) disposed in an engine room, the panel member 24 is disposed in such a manner that the convex shape of the panel member 24 corresponding to the bend portion of the frame 20 is gradually flattened toward the bulkhead upper center frame 18a as shown in FIG. 3A, which allows to increase the rigidity of the frame 20 to more reliably prevent the frame 20 from being deformed.

Moreover, the panel member 24 is adhered to the upper surface of the frame 20 and the side surface of the frame 20 with an adhesive agent as shown in FIG. 3E, whereby the panel member 24 can be more securely fixed to the frame 20.

As described above, the panel member 24 made of a lightweight rigid member is provided to cover the grid portion 30 in the embodiment, which allows to improve the rigidity of the front body of the vehicle with smaller increase in vehicle weight and to efficiently improve rigidity of the front body of the vehicle relative to the vehicle weight. It is more preferable to form the panel member 24 with Carbon Fiber Reinforced Material to make the panel member 24 lighter. Furthermore, in the embodiment, the frame 20 and the bulkhead upper center frame 18a disposed substantially parallel to each other are also prevented from being deformed in directions other than the direction of their axial force, which allows to maximize the cross sectional performance of the frame 20 and the bulkhead upper center frame 18a.

Figure 4:
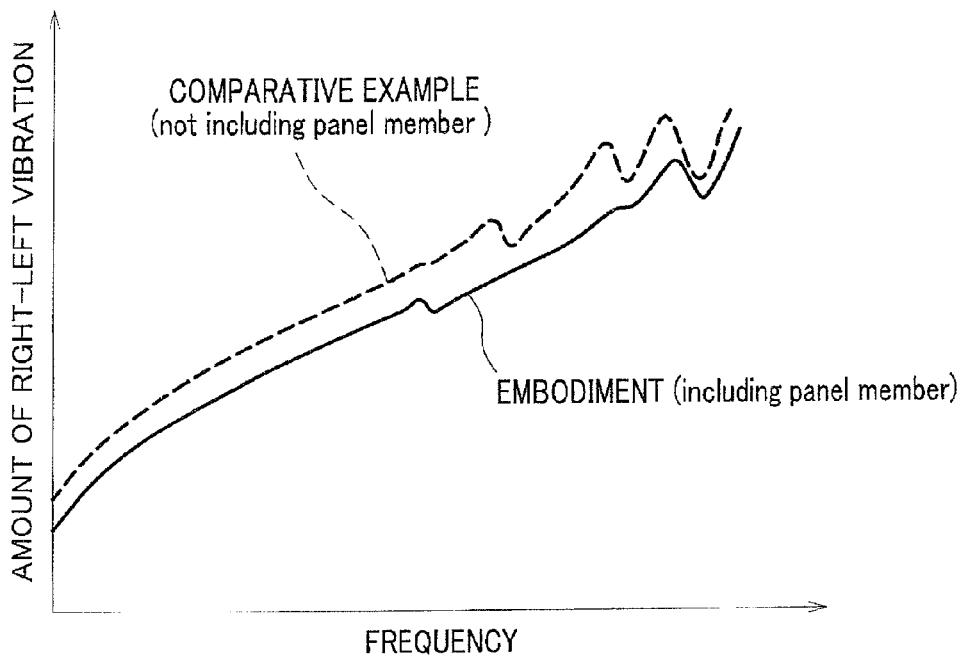
FIG. 4 shows a relationship between the amount of right-left vibration of the grid portion 30 and a vibrational frequency generated by an external force.

FIG. 4 shows a relationship between the amount of right-left vibration of the grid portion 30 and a vibrational frequency generated by an external force. In FIG. 4, a characteristic curve according to a comparative example in which the panel member 24 is removed (refer to FIG. 2) is shown in dashed line, and a characteristic curve according to the embodiment in which the panel member 24 is provided (refer to FIG. 1) is shown in full line.

Figure 5:
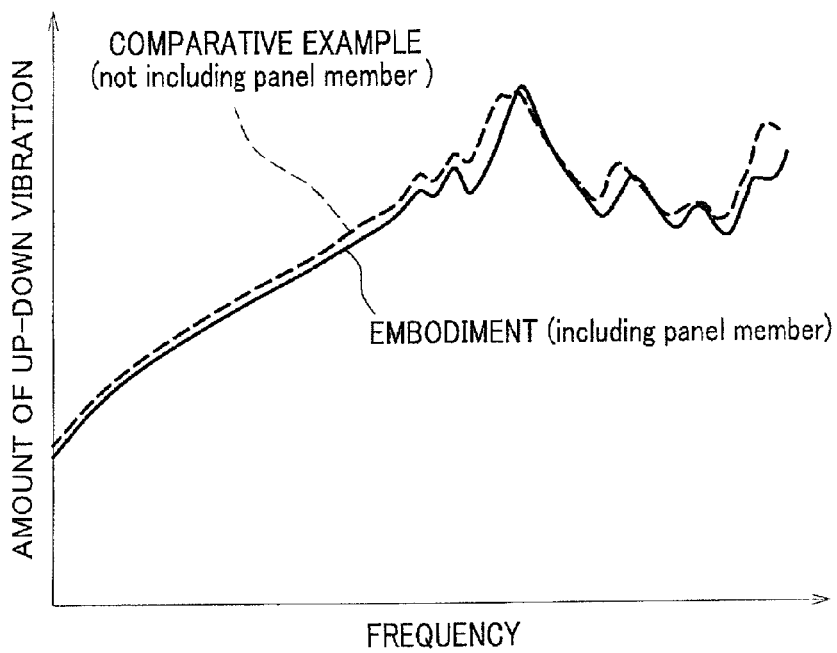
FIG. 5 shows a relationship between the amount of up-down vibration of the grid portion 30 and a vibrational frequency generated by an external force.

FIG. 5 shows a relationship between the amount of up-down vibration of the grid portion 30 and a vibrational frequency generated by an external force. In FIG. 5, a characteristic curve according to the comparative example in which the panel member 24 is removed (refer to FIG. 2) is shown in dashed line, and a characteristic curve according to the embodiment in which the panel member 24 is provided (refer to FIG. 1) is shown in full line.

As shown by the characteristic curves in FIGS. 4 and 5, both the amounts of up-down and right-left vibrations of the grid portion 30 are decreased in the embodiment where the panel member 24 is provided, compared with the comparative example without the panel member 24. The experiments have proved that in the embodiment, both the amounts of up-down and right-left vibrations were reduced and the rigidity of the front body of the vehicle including the grid portion 30 was improved by providing the panel member 24.

Furthermore, in the embodiment, the panel member 24 fixed to the grid portion 30 may also have the function of a dressing cover such as a grille cover and an engine cover to improve the visual beauty in the engine compartment. Outer circumferential edges of the panel member 24 may be rimmed with a frame body (not shown).

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A front body structure for a vehicle, comprising a panel member and a rectangular grid portion, said grid portion comprising:

a pair of upper members extending in a longitudinal direction of a vehicle body, supporting a pair of front wheel dampers and disposed on opposite sides of the vehicle body;

a bulkhead upper center frame connected to front ends of the pair of upper members; and, a frame disposed rearward of the bulkhead upper center frame in parallel to the bulkhead upper center frame and suspended between the pair of upper members;

said panel member covers an opening of the grid portion, said panel member having a peripheral edge and a lower surface, and wherein the lower surface of said panel member, along said peripheral edge, rests upon an upper surface provided by said rectangular grid portion.

2. The front body structure according to claim 1, wherein the panel member is formed of fiber reinforced composite material made of at least one of Carbon Fiber Reinforced Plastics, Glass Fiber Reinforced Plastics and poly-paraphenylene terephthalamide Fiber Reinforced Plastics having continuous fibers, and wherein an extending direction of said continuous fibers of the fiber reinforced composite material extend in a direction which crosses a longitudinal direction of the vehicle body.

3. The front body structure according to claim 1, wherein the frame, at a center part thereof, is bent upward in a convex shape in a front view, and the panel member is formed such that a shape of the panel member is convex along the center part of the frame and is gradually flattened toward the bulkhead upper center frame.

4. The front body structure according to claim 2, wherein the frame, at a center part thereof, is bent upward in a convex shape in a front view, and the panel member is formed such that a shape of the panel member is convex along the center part of the frame and is gradually flattened toward the bulkhead upper center frame.

5. The front body structure according to claim 1, wherein the panel member is fixed to an upper surface of the frame and a side surface of the frame which is opposed to the bulkhead upper center frame with an adhesive agent.

6. The front body structure according to claim 2, wherein the panel member is fixed to an upper surface of the frame and a side surface of the frame which is opposed to the bulkhead upper center frame with an adhesive agent.

7. The front body structure according to claim 3, wherein the panel member is fixed to an upper surface of the frame and a side surface of the frame which is opposed to the bulkhead upper center frame with an adhesive agent.

8. The front body structure according to claim 4, wherein the panel member is fixed to an upper surface of the frame and a side surface of the frame which is opposed to the bulkhead upper center frame with an adhesive agent.

* * * * *